United States Patent Office 3,341,591
Patented Sept. 12, 1967

3,341,591
1-(o-CHLOROPHENYL)- AND 1-(o,p-DICHLORO-PHENYL)-2-HYDRAZINOPROPANES
Edward L. Schumann, Kalamazoo Township, Kalamazoo County, Mich., assignor to The Upjohn Company, Kalamazoo, Mich., a corporation of Delaware
No Drawing. Filed Dec. 7, 1959, Ser. No. 857,542
4 Claims. (Cl. 260—569)

This invention relates to novel derivatives of hydrazine and is more particularly concerned with derivatives of 1-halophenyl-2-hydrazinopropanes and acid addition salts thereof, and with processes for their preparation. This application is a continuation-in-part of application Ser. No. 823,016, filed June 26, 1959, now abandoned.

The novel compounds of the invention can be represented by the following general formula:

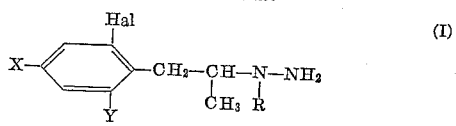

wherein Hal represents a halogen atom selected from the class consisting of chlorine, bromine, and fluorine and wherein one of the radicals X and Y represents hydrogen, the other of the radicals X and Y being selected from the class consisting of hydrogen, chlorine, bromine, and fluorine, and R is selected from the class consisting of hydrogen and alkyl containing from 1 to 3 carbon atoms, inclusive.

The term "alkyl containing from 1 to 3 carbon atoms, inclusive," includes methyl, ethyl, propyl and isopropyl groups.

The compounds of the invention having the Formula (I) above can exist in free base form or in the form of acid addition salts. It is to be understood that both the free base form and the acid addition salts fall within the scope of the present invention.

The novel compounds of the invention exhibit valuable pharmacological activity. Illustratively, the compounds of the invention are enzyme inhibitors. Thus, for example, the compounds of the invention inhibit the enzyme system, monoamine oxidase, and are active, when administered orally, in inhibiting this enzyme system in the brain and liver. Monoamine oxidase is responsible for the destruction in the body of a number of physiologically active amines, including serotonin, and hence compounds which inhibit this enzyme system provide a means of regulating the rate at which said amines are destroyed in the body. Further, the compounds of the invention are also potent inhibitors of decarboxylase enzymes. For example, the compounds inhibit the system 5-hydroxytryptophan decarboxylase which is responsible for the conversion of 5-hydroxytryptophan to serotonin in the body. [Udenfriend et al., J. Biol. Chem. 224, 803 (1957)]. Whilst the precise role which serotonin plays in the complex series of chemical reactions occurring in the brain, both normal and abnormal, is not yet clear, it is becoming increasingly evident that serotonin does have a significant effect on the manner in which the brain functions, and may be a causative agent in mental disease. 5-hydroxytryptophan is known to be the precursor of serotonin released in the brain [serotonin itself does not cross the blood-brain barrier; see Fed. Proc. 15, 402 and 493 (1957)].

Hence the compounds of the invention, which inhibit both the enzyme responsible for the formtaion of serotonin and also the enzyme responsible for its destruction, provide a means of regulating the supply of serotonin to the brain and also of regulating the rate at which serotonin in the brain is destroyed.

The novel compounds of the invention also inhibit other decarboxylases. Illustratively, the compounds of the invention inhibit the enzyme system dihydroxyphenylalanine decarboxylase and like decarboxylases, thus providing means of regulating bodily levels, including brain levels, of pharmacologically active amines such as dopamine, epinephrine, and norepinephrine. The regulation of serotonin, dopamine, epinephrine, norepinephrine, etc., is useful in the management of abnormal conditions such as mental disease, inflammations, allergies and gastrointestinal hypermotility.

The activity of the compounds of the invention as enzyme inhibitors also makes them valuable as laboratory agents. Thus the compounds of the invention can be used in the research laboratory to inhibit selectively monoamine oxidase and/or decarboxylase enzymes in mixed enzyme systems. They can also be used in the characterization and quantitative determination of monoamine oxidase and decarboxylase enzymes in the laboratory.

The novel compounds of the invention are characterized by almost complete absence of amphetamine-like activity, which activity is associated with related hydrazine compounds.

The novel compounds of the invention are also useful as intermediates in chemical synthesis. For example, the compounds of the invention can be treated with acids, preferably in the form of their halides or anhydrides, to form the corresponding hydrazides. Illustratively, the compounds of the invention having Formula (I) in which R is hydrogen, can be treated with isonicotinoyl chloride to form the corresponding mono- or dihalophenyl derivatives of isonicotinic acid 2-isopropylhydrazide (iproniazid), which compound is used widely in the treatment of mental disease. Further the compounds of the invention can be reacted with yohimbine to form the corresponding yohimbic acid hydrazides according to U.S. Patent 2,726,243.

The novel compounds of the invention having the Formula (I) above in which R represents hydrogen can be prepared in a convenient manner by reacting a ketone having the formula:

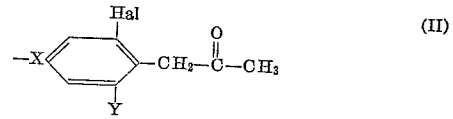

wherein Hal, X, and Y have the significance hereinbefore defined, with hydrazine and subjecting the hydrazone so obtained to catalytic hydrogenation to obtain the desired compound having the Formula (I) [R=H]. The reaction of the ketone with the hydrazine (preferably in the form of its hydrate) can be carried out advantageously by mixing the reactants in solution in an inert solvent such as methanol, ethanol, isopropyl alcohol, ethyl acetate, dioxane, and the like. The reaction can be carried out at room temperature (about 20 to 30° C.), but in order to increase the reaction rate it is preferred to employ elevated temperatures, such as the boiling point of the mixture at atmospheric pressure. If desired, the hydrazone so formed can be isolated, for example, by evaporation of the reaction mixture, and purified, for example, by fractional distillation in vacuo. However, it is generally unnecessary to isolate or purify the hydrazone. The reaction mixture obtained as described above can be subjected directly to catalytic hydrogenation using catalysts such as platinum oxide. Preferably the reaction mixture obtained in the formation of the hydrazone is acidified, for example, by the addition of at least a stoichiometric amount of acetic acid, before being subjected to hydrogenation. After hydrogenation is complete the desired compound having the Formula (I) above in which R represents hydrogen can be isolated from the reaction mixture, for example, by filtration of the mixture to remove the catalyst and evaporation of the filtrate to dryness. The crude product so obtained can be purified by conventional procedures, for example, by conversion to the free base followed by distillation, or by conversion to a crystalline acid addition salt.

The halophenylacetones having the Formula (II) above, which are employed as starting materials in the process described above, can themselves be obtained readily from the corresponding halobenzaldehydes by condensation of the latter with nitroethane in the presence of butylamine, followed by reductive hydrolysis of the intermediate nitropropene, according to the procedure described in U.S. Patent 2,557,051 for the preparation of o-methyoxyphenylacetone from o-methoxybenzaldehyde. The halobenzaldehydes which are employed in said process are, for the most part, known compounds. Thus the preparation of o-chlorobenzaldehyde, o,p-dichlorobenzaldehyde, o,o'-dichlorobenzaldehyde, o-bromobenzaldehyde, and o-bromo-o'-chlorobenzaldehyde is described in Beilsteins Handbuch der Organischen Chemie, 4th edition, volume 7, pages 233 to 239; the preparation of o-fluorobenzaldehyde and o,p-dibromobenzaldehyde is described in Beilsteins Handbuch der Organischen Chemie, 4th edition, 1st supplement, volume 7, pages 132 to 135. The preparation of o,o'-difluorobenzaldehyde, o,o'-dibromobenzaldehyde and o-chloro-o'-fluorobenzaldehyde is described by Lock et al., Berichte 69B, 2253 (1936). In general the halobenzaldehydes which are employed as starting materials in the process described above can be prepared from the corresponding halotoluenes via the benzal bromides as described by Lock et al., supra. The halotoluenes can themselves be prepared by methods known in the art; such methods are summarized in Chemistry of Carbon Compounds, edited by E. H. Rodd, vol. IIIA, pp. 121-122, Elsevier, 1954.

The compounds of the invention having the Formula (I) above in which R represents alkyl can be prepared by converting an amine having the general formula:

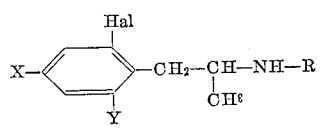

(III)

wherein Hal, X and Y have the significance hereinbefore described and R represents an alkyl group containing from 1 to 3 carbon atoms, inclusive, to the corresponding N-nitroso compound and reducing the latter compound to the desired compound having the Formula (I). The conversion of the Compound (III) to the corresponding N-nitroso compound can be effected in a convenient manner by treating an aqueous solution of the Compound (III), preferably in the form of an acid addition salt such as the hydrochloride, sulfate, and the like, with nitrous acid, for example by the addition of a nitrite such as sodium nitrite, barium nitrite, and the like, in the presence of a mineral acid such as sulfuric acid, hydrochloric acid, and the like. The reaction is preferably carried out at a temperature within the range of about 5° C. to about 20° C. Advantageously the nitrite is employed in excess of the molar proportion and preferably the nitrite is employed in an amount representing about 2.5 times the molar proportion, based on the amount of Compound (III). The N-nitroso compound so obtained can be isolated from the reaction mixture by conventional procedures, for example, by extraction in a suitable solvent such as ether. The N-nitroso compound is generally employed without purification in the next stage of the synthesis. The N-nitroso compound can be reduced to the desired compound having the Formula (I) above in a convenient manner by treatment with lithium aluminum hydride in a suitable solvent such as anhydrous ether. The reduction is preferably carried out at elevated temperatures, for example at the reflux temperature of the reaction mixture. Advantageously the lithium aluminum hydride is present in an amount slightly in excess (e.g., 20% to 30% in excess) of the molar proportion, based on the N-nitroso compound. The desired compound having the Formula (I) above in which R represents alkyl can be isolated from the reaction mixture by decomposing the latter with water, separating the organic phase, drying the latter, and removing the solvent by distillation. The product is obtained can be purified by conventional procedures, for example by distillation.

The compounds having the Formula (III) above which are employed as starting materials in the above-described synthesis can be obtained readily by reductive amination of the appropriate ketones having the Formula (II) above, using the appropriate alkylamine, according to the procedure described by Heinzelman, J. Am. Chem. Soc. 75, 921 (1953) for the preparation of N-[β-(o-methoxyphenyl)-isopropyl]methylamine from o-methoxyphenylacetone and methylamine.

The acid addition salts of the invention comprise the salts of the free bases having the Formula (I) with organic and inorganic monobasic and polybasic acids. Advantageously acids such as hydrochloric, hydrobromic, hydriodic, sulfuric, phosphoric, nitric, acetic, benzoic, salicylic, glycolic, succinic, nicotinic, ascorbic, tartaric, maleic, malic, lacti, algini, cyclohexysulfamic acids, and like pharmacologically acceptable acids are used, especially when the acid addition salt is intended for therapeutic use. The acid addition salts of the invention can be prepared in a convenient manner by reacting stoichiometric proportions of the acid and a free base compound having the Formula (I) in the presence of a suitable solvent such as water, dioxane, ethyl acetate, methanol, ethanol, isopropyl alcohol, ether, and the like.

When used in therapy the novel compounds of the invention, in free base form or in the form of pharmacologically acceptable acid addition salts, can be combined with solid or liquid pharmaceutical carriers and formulated in the form of tablets, powder packets, or capsules, using starch and like excipients, or dissolved or suspended in suitable solvents or vehicles, for oral or parenteral administration.

The following examples are illustrative of the processes and products of the present invention, but are not to be construed as limiting.

EXAMPLE 1

*1-(o-chlorophenyl)-2-hydrazinopropane and the hydrochloride thereof*

A. O-CHLOROPHENYLACETONE

A mixture of 40.74 g. (0.29 mole) of o-chlorobenzaldehyde, 78 ml. of toluene, 6 ml. of n-butylamine, and 26.6 g. (0.354 mole) of nitroethane was heated (approximately 9 hr.) under reflux until the theoretical amount of water had been collected in a water trap. The crude solution of 1-(o-chlorophenyl) - 2 - nitro-1-propene so obtained was mixed with 118 g. of 100-mesh iron powder, 1.2 g. of ferric chloride hexahydrate, and 300 ml. of water. The mixture was heated to 65° C. and stirred while 103 ml. of concentrated hydrochloric acid was added slowly over a period of 1 hr. During the addition of the acid refluxing began, and after the addition was complete the mixture was heated under reflux for an additional 45 minutes. The resulting mixture was subjected to steam distillation until a total of 2.5 l. of distillate had been collected. The organic layer of the distillate was separated and the aqueous layer was extracted with benzene. The combined extract and organic layer were washed once with a 3% aqueous solution of sodium bisulfite, before being dried over anhydrous magnesium sulfate. The dried solution was filtered and the filtrate was evaporated. The residue was distilled in vacuo. There was thus obtained o-chlorophenylacetone in the form of an oil having a boiling point of 81 to 85° C. at a pressure of 0.25 to 0.45 mm. of mercury; $n_D^{26}=1.5346$.

*Analysis.*—Calcd. for $C_9H_9ClO$: C, 64.11; H, 5.38; Cl, 21.02. Found: C, 63.84; H, 5.77; Cl, 21.39.

B. 1-(O-CHLOROPHENYL)-2-HYDRAZINOPROPANE AND THE HYDROCHLORIDE THEREOF

A solution of 5 g. (0.1 mole) of hydrazine hydrate in 15 ml. of methanol was added rapidly, in one batch, to a refluxing solution of 16.9 g. (0.1 mole) of o-chlorophenylacetone (prepared as described above) in 30 ml. of methanol. After the initial reaction had subsided, the solution was heated for 1 hr. under reflux and then cooled to about 25° C. The cooled solution was mixed with 1 g. of platinum oxide catalyst and 7 g. (0.11 mole) of glacial acetic acid, and the mixture was treated with hydrogen at an initial pressure of 50 p.s.i. The absorption of 1 molar equivalent of hydrogen was complete in 3 hrs. The catalyst was removed by filtration, and the filtrate was concenetrated and made alkaline by the addition of an excess of a 20% aqueous solution of sodium hydroxide. The resulting mixture was extracted with 3 portions, each of 50 ml., of chloroform. The combined chloroform extracts were washed with water and dried over anhydrous sodium sulfate. The dried solution was filtered, the filtrate was evaporated to dryness, and the residue was distilled in vacuo. The fraction having a boiling point of 72 to 91° C. at a pressure of 0.04 mm. of mercury was collected. There was thus obtained 1-(o-chlorophenyl)-2-hydrazinopropane in the form of an oil. The oil was dissolved in anhydrous ether and the solution was treated with an equivalent of ethereal hydrogen chloride. The solid which separated was isolated by filtration, washed with ether, and recrystallized twice from ethyl acetate. There was thus obtained 3.2 g. of 1-(o-chlorophenyl) - 2 - hydrazinopropane hydrochloride in the form of a crystalline solid having a melting point of 120 to 121° C.

*Analysis.*—Calcd. for $C_9H_{13}ClN_2 \cdot HCl$: C, 48.88; H, 6.38; N, 12.67; Cl, 32.07. Found: C, 48.71; H, 6.28; N, 12.59; Cl, 31.91.

EXAMPLE 2

*1-(o,p-dichlorophenyl)-2-hydrazinopropane and the hydrochloride thereof*

A. O,P-DICHLOROPHENYLACETONE

A mixture of 100 g. (0.57 mole) of o,p-dichlorobenzaldehyde, 150 ml. of toluene, 11.9 ml. of n-butylamine, and 52.6 g. of nitroethane was heated (about 9 hr.) under reflux until the theoretical amount of water had been collected. The solution of 1-(o,p-dichlorophenyl)-2-nitro-1-propene so obtained was mixed with 232 g. of 100-mesh iron powder, 2.32 g. of ferric chloride hexahydrate, and 584 ml. of water. The mixture was heated to 65° C. and stirred while 103 ml. of concentrated hydrochloric acid was added slowly over a period of 1 hr. During the addition of the acid refluxing began, and after the addition was complete the mixture was heated under reflux for an additional 45 minutes. The resulting mixture was subjected to steam distillation until a total of 2.5 l. of distillate had been collected. The organic layer of the distillate was separated and the aqueous layer was extracted with ether. The combined extract and organic layer were washed once with a 3% aqueous solution of sodium bisulfite before being dried over anhydrous magnesium sulfate. The dried solution was filtered and the filtrate was evaporated, the last traces of solvent being removed in vacuo at 50° C. The residue was distilled in vacuo using a short path distillation apparatus. Two fractions were isolated having boiling points of 95 to 100° C. and 100 to 105° C. at a pressure of 2 mm. of mercury. These fractions were combined to give a total of 65.88 g. of o,p-dichlorophenylacetone.

*Analysis.*—Calcd. for $C_9H_8Cl_2O$: C, 53.23; H, 3.97; Cl, 34.92. Found: C, 53.21; H, 3.98; Cl, 35.51.

B. 1-(O,P-DICHLOROPHENYL)-2-HYDRAZINOPROPANE AND THE HYDROCHLORIDE THEREOF

A solution of 5 g. (0.1 mole) of hydrazine hydrate in 15 ml. of methanol was added rapidly, in one batch, to a refluxing solution of 20.3 g. (0.1 mole) of o,p-dichlorophenylacetone (prepared as described above) in 30 ml. of methanol. After the initial reaction had subsided, the solution was heated for 1 hr. under reflux and then cooled to about 25° C. The cooled solution was mixed with 1 g. of platinum oxide catalyst and 7 g. (0.11 mole) of glacial acetic acid, and the mixture was treated with hydrogen at an initial pressure of 50 p.s.i. The absorption of 1 molar equivalent of hydrogen was complete in 3 hrs. The catalyst was removed by filtration, and the filtrate was concentrated and made alkaline by the addition of an excess of a 20% aqueous solution of sodium hydroxide. The resulting mixture was extracted with 3 portions, each of 50 ml., of chloroform. The combined chloroform extracts were washed with water and dried over anhydrous sodium sulfate. The dried solution was filtered, the filtrate was evaporated to dryness, and the residue was distilled in vacuo. There was thus obtained 1-(o,p-dichlorophenyl)-2-hydrazinopropane in the form of an oil having a boiling point of 93 to 115° C. at a pressure of 0.05 mm. of mercury. The oil was dissolved in anhydrous ether and the solution was treated with an equivalent of ethereal hydrogen chloride. The solid which separated was isolated by filtration, washed with ether, and recrystallized three times from ethyl acetate containing a small amount of isopropyl alcohol. There was thus obtained 2.1 g. of 1-(o,p-dichlorophenyl)-2-hydrazinopropane hydrochloride in the form of a crystalline solid having a melting point of 125 to 150° C.

*Analysis.*—Calcd. for $C_9H_{12}Cl_2N_2 \cdot HCl$: C, 42.29; H, 5.13; N, 10.96; Cl, 41.62. Found: C, 41.82; H, 5.06; N, 10.58; Cl, 41.21.

EXAMPLE 3

*1-(o,o'-dichlorophenyl)-2-hydrazinopropane and the hydrochloride thereof*

A. O,O'-DICHLOROPHENYLACETONE

Using the procedure described in Example 2A, but replacing o,p-dichlorobenzaldehyde by o,o'-dichlorobenzaldehyde, there was obtained o,o'-dichlorophenylacetone in the form of an oil having a boiling point of 73 to 78° C. at a pressure of 0.07 mm. of mercury.

B. 1-(O,O'-DICHLOROPHENYL)-2-HYDRAZINOPROPANE AND THE HYDROCHLORIDE THEREOF

Using the procedure described in Example 2B, but replacing o,p-dichlorophenylacetone by o,o'-dichlorophenylacetone, there was obtained 1-(o,o'-dichlorophenyl)-2-hydrazinopropane having a boiling point of 93 to 118° C. at a pressure of 0.05 mm. of mercury. The oily base so obtained was dissolved in anhydrous ether and the ethereal solution was treated with an equivalent of ethereal hydrogen chloride. The hygroscopic hydrochloride which separated was isolated by decantation and dried in vacuo before being recrystallized twice from a mixture of ethyl acetate and ether. There was thus obtained 1-(o,o'-dichlorophenyl) - 2 - hydrazinopropane hydrochloride in the form of a crystalline solid having a melting point of 130 to 133° C.

*Analysis.*—Calcd. for $C_9H_{12}Cl_2N_2 \cdot HCl$: C, 42.29; H, 5.13; N, 10.96; Cl, 41.62. Found: C, 42.48; H, 5.44; N, 11.15; Cl, 41.52.

EXAMPLE 4

*1-(o-chloro-α-methylphenethyl)-1-methylhydrazine and the hydrochloride thereof*

A solution of 44.1 g. (0.2 mole) of N-[β-(o-chlorophenyl)isopropyl]methylamine hydrochloride [prepared from o-chlorophenylacetone and methylamine using the procedure described by Heinzelman, supra] in 170 ml. of water was treated with 51 g. of 30% sulfuric acid. The solution was maintained at 5 to 10° C. and stirred during the addition of a solution of 34 g. (0.5 mole) of sodium nitrite in 60 ml. of water over a period of 30 minutes.

After the addition was complete the mixture was stirred for 2 hrs. at approximately 20° C. and then extracted with 2 portions, each of 250 ml., of ether. The combined ether extracts were washed with 50 ml. of 40% aqueous potassium hydroxide solution, dried over anhydrous potassium carbonate, and evaporated. There was thus obtained N-nitroso-N-methyl-1-(o-chlorophenyl)-2-propylamine.

The latter was dissolved in 300 ml. of anhydrous ether and the solution so obtained was added slowly, over a period of 1 hr., to a stirred solution of 8.7 g. (0.23 mole) of lithium aluminum hydride in 500 ml. of anhydrous ether. After the addition was complete the mixture was stirred and heated under reflux for 1 hr. before being cooled and decomposed by the careful addition of 22 g. (0.25 mole) of ethyl acetate followed by 45 g. (2.5 moles) of water. The resulting mixture was filtered and the filtrate was dried over anhydrous magnesium sulfate. The dried solution was filtered and the filtrate was evaporated. The residue was distilled in vacuo. There was thus obtained 1-(o-chloro-α-methylphenethyl)-1-methylhydrazine in the form of an oil. The oil so obtained was dissolved in anhydrous ether and the ethereal solution was treated with a slight excess of an ethereal solution of hydrogen chloride. The solid which separated was isolated by filtration and was recrystallized from ethyl acetate and then from isopropyl alcohol. There was thus obtained 1-(o-chloro-α-methylphenethyl) - 1 - methylhydrazine hydrochloride in the form of a crystalline solid.

In similar manner, but replacing N-[β-(o-chlorophenyl) isopropyl]methylamine hydrochloride by the hydrochlorides of N - [β-(o,p-dichlorophenyl)isopropyl]methylamine and N-[β-(o,o'-dichlorophenyl)isopropyl]methylamine (prepared by the reaction of methylamine with o,p-dichlorophenylacetone and o,o'-dichlorophenylacetone, respectively, using the procedure of Heinzelman, supra), there were obtained 1-(o,p-dichloro-α-methylphenethyl)-1'-methylhydrazine and 1-(o,o'-dichloro-α-methylphenethyl)-1-methylhydrazine, respectively, and the hydrochlorides thereof.

EXAMPLE 5

*1-(-o-chloro-α-methylphenethyl)-1-ethylhydrazine and the hydrochloride thereof*

Using the procedure described in Example 4, but replacing N-[-(o-chlorophenyl)isopropyl]methylamine hydrochloride by N-[β-(o-chlorophenyl)isopropyl]ethylamine hydrochloride (prepared from o-chlorophenylacetone and ethylamine according to the procedure described by Heinzelman, supra), there was obtained 1-(o-chloro-α-methylphenethyl)-1-ethylhydrazine and the hydrochloride thereof.

In similar manner but replacing N-[β-(o-chlorophenyl) isopropyl]ethylamine hydrochloride by N-[β-(o-chlorophenyl) isopropyl]isopropylamine hydrochloride (prepared from o-chlorophenylacetone and isopropylamine by the procedure described by Heinzelman, supra) there was obtained 1-(o-chloro-α-methylphenethyl)-1-isopropylhydrazine and the hydrochloride thereof.

EXAMPLE 6

*1-(o-fluorophenyl)-2-hydrazinopropane and the hydrochloride thereof*

A. O-FLUOROPHENYLACETONE

A mixture of 100 g. (0.805 mole) of o-fluorobenzaldehyde, 300 ml. of toluene, 23.7 ml. of n-butylamine, and 79.3 g. (1.06 moles) of nitroethane was heated (approximately 18 hr.) under reflux until the theoretical amount of water had been collected in a water trap. The crude solution of 1-(o-fluorophenyl)-2-nitro-1-propene so obtained was mixed with 326 g. of 100-mesh iron powder, 3.3 g. of ferric chloride hexahydrate, and 875 ml. of water. The resulting mixture was stirred and warmed to 80° C. and a total of 292 ml. of concentrated hydrochloric acid was added slowly at such a rate that refluxing was maintained. After the addition of acid was complete (1.25 hr.) the mixture was heated under reflux for a further 0.5 hr. and then subjected to steam distillation until 8 l. of distillate had been collected. The organic layer of the distillate was collected and the aqueous layer was extracted with four 500-ml. portions of benzene. The combined organic layer and extracts were washed twice with 1-liter portions of 3% aqueous sodium bisulfite solution and then with water before being dried over anhydrous magnesium sulfate. The dried solution was filtered and the filtrate was evaporated. The residue was distilled in vacuo. There was thus obtained o-fluorophenylacetone in the form of a colorless oil having a boiling point of 47° C. at a pressure of 0.05 mm. of mercury;

$$n_D^{25} = 1.4074$$

*Analysis.*—Calcd. for $C_9H_9FO$: C, 71.04; H, 5.96; F, 12.49. Found: C, 71.29; H, 6.11; F, 12.79.

B. 1-(O-FLUOROPHENLY)-2-HYDRAZINOPROPANE AND THE HYDROCHLORIDE THEREOF

A boiling solution of 30.4 g. (0.2 mole) of o-fluorophenylacetone (prepared as described above) in 100 ml. of methanol was treated, all at once, with a solution of 10 g. (0.2 mole) of hydrazine hydrate in 50 ml. of methanol. After the initial reaction had subsided the solution was heated under reflux for 0.5 hr. and then cooled. The cold solution was mixed with 1 g. of platinum oxide catalyst and 15.5 ml. of glacial acetic acid, and the mixture was treated with hydrogen at an initial pressure of 50 p.s.i. The calculated amount of hydrogen was absorbed in 0.5 hr. The catalyst was removed by filtration and the filtrate was concentrated and made alkaline by the addition of an excess of a 20% aqueous solution of sodium hydroxide. The resulting mixture was extracted with three 200-ml. portions of chloroform. The chloroform extracts were combined and washed with water before being dried over anhydrous sodium sulfate. The dried solution was filtered, the filtrate was evaporated to dryness, and the residue was distilled in vacuo. The fraction having a boiling point of 64 to 67° C. at a pressure of 0.1 mm. was collected. There was thus obtained 1-(o-fluorophenyl)-2-hydrazinopropane in the form of an oil. The oil was dissolved in anhydrous ether and the solution was treated with an equivalent of ethereal hydrogen cholride. The solid which separated was isolated by filtration, washed with ether, and recrystallized twice from ethyl acetate. There was thus obtained 1-(o-fluorophenyl)-2-hydrazinopropane hydrochloride in the form of a crystalline solid having a melting point of 105 to 107° C.

*Analysis.*—Calcd. for $C_9H_{13}FN_2 \cdot HCl$: C, 52.81; H, 6.89; N, 13.69; Cl, 17.32; F, 9.28. Found: C, 52.90; H, 7.12; N, 13.73; Cl, 17.46; F, 8.93.

EXAMPLE 7

*1-(o-o'-difluorophenyl)-2-hydrazinopropane and the hydrochloride thereof*

Using the procedure described in Example 6, but replacing o-fluorobenzaldehyde by o,o'-difluorobenzaldehyde, there was obtained 1-(o,o'-difluorophenyl)-2-hydrazinopropane and the hydrochloride thereof.

EXAMPLE 8

*1-(o-bromophenyl)-2-hydrazinopropane and the hydrochloride thereof*

Using the procedure described in Example 6, but replacing o-fluorobenzaldehyde by o-bromobenzaldehyde, there was obtained 1-(o-bromophenyl)-2-hydrazinopropane and the hydrochloride thereof.

EXAMPLE 9

*1-(o-chloro-o'-fluorophenyl)-2-hydrazinopropane and the hydrochloride thereof*

Using the procedure described in Example 6, but replacing o-fluorobenzaldehyde by o-chloro-o'-fluorobenzaldehyde, there was obtained 1-(o-chloro-o'-fluorophenyl)-2-hydrazinopropane and the hydrochloride thereof.

EXAMPLE 10

*1-(o-fluoro-α-methylphenethyl)-1-methylhydrazine and the hydrochloride thereof*

Using the procedure described in Example 4, but replacing N-[β-(o-chlorophenyl)isopropyl]methylamine hydrochloride by N-[β-(o-fluorophenyl)isopropyl]methylamine hydrochloride (prepared from o-fluorophenylacetone and methylamine using the procedure described by Heinzelman, supra), there was obtained 1-(o-fluoro-α-methylphenethyl)-1-methylhydrazine and the hydrochloride thereof.

EXAMPLE 11

Ten thousand (10,000) scored tablets for oral use, each containing 25 mg. of 1-(o-chlorophenyl)-2-hydrazinopropane hydrochloride, are prepared from the following types and amounts of materials:

| | G. |
|---|---|
| 1-(o-chlorophenyl)-2-hydrazinopropane hydrochloride | 250 |
| Citric acid U.S.P. | 20 |
| Dibasic calcium phosphate U.S.P. | 2,500 |
| Colloidal magnesium aluminum silicate | 60 |
| Talc U.S.P. | 30 |
| Calcium stearate | 10 |

The finely powdered citric acid, dibasic calcium phosphate, and colloidal magnesium aluminum silicate are mixed well and the mixture is granulated with a 4% aqueous solution of methylcellulose U.S.P. (1,500 cps.). The wet mass is forced through an 8-mesh screen, dried at 120° F. in a forced-air oven, and then put through a 16-mesh screen. The remainder of the ingredients, in fine powder form, are mixed well and then mixed with the dried granules. The final mixture is then compressed into tablets of the proper weight.

I claim:
1. 1-(o-chlorophenyl)-2-hydrazinopropane.
2. 1-(o-chlorophenyl)-2-hydrazinopropane hydrochloride.
3. 1-(o,p-dichlorophenyl)-2-hydrazinopropane.
4. 1-(o,p-dichlorophenyl)-2-hydrazinopropane hydrochloride.

References Cited

Biel et al., Jour. Am. Chem. Soc., vol. 81, pp. 2805–2813, June 5, 1959.

CHARLES B. PARKER, *Primary Examiner.*

LEON ZITVER, *Examiner.*

F. J. CULLEN, F. D. HIGEL, *Assistant Examiners.*